Aug. 25, 1970     T. KENNEDY, JR     3,525,656
METHOD OF SIMULTANEOUSLY APPLYING A FLEXIBLE PLASTIC
FILM AND A FLEXIBLE CARRIER BOARD TO A PIPE
Filed May 9, 1967

INVENTOR
TED KENNEDY JR.

BY Whittemore, Hulbert & Belknap
ATTORNEYS

United States Patent Office 3,525,656
Patented Aug. 25, 1970

3,525,656
METHOD OF SIMULTANEOUSLY APPLYING A FLEXIBLE PLASTIC FILM AND A FLEXIBLE CARRIER BOARD TO A PIPE
Ted Kennedy, Jr., Ann Arbor, Mich., assignor to The Trenton Corporation, Ann Arbor, Mich., a corporation of Michigan
Filed May 9, 1967, Ser. No. 637,168
Int. Cl. B65h *81/00*
U.S. Cl. 156—188       5 Claims

ABSTRACT OF THE DISCLOSURE

This invention relates to a method of combining components of a wrapper and applying the same to a pipe, particularly a pipe that is intended to be installed in the ground.

The covering consists of a flexible plastic film and a flexible carrier board. The two are simultaneously withdrawn from separate supply rolls, brought into surface-to-surface contact as they are withdrawn at a point prior to contact with the pipe, and then together are helically wound on the pipe with the plastic film inward toward the pipe. One edge of the plastic film extends beyond the corresponding edge of the carrier board, and is overlapped by succeeding convolutions to provide a plastic-to-plastic contact at the joint. The carrier board supports and protects the plastic film from the heat of the hot-applied undercoating and, when used, the hot-applied overcoating.

BACKGROUND OF THE INVENTION

Heretofore, a covering of this type has been preassembled in a factory or shop. The components were adhered or bonded together before winding on a core, or simply loosely interwound. The composite wrapper was withdrawn from the core at the time of application to a pipe.

SUMMARY OF THE INVENTION

The essential object of the invention is to provide a method of wrapping a pipe with a covering of this type by withdrawing the plastic film and carrier board from separate supply rolls, bringing them into surface-to-surface relationship at a point prior to application to the pipe, completely or partially adhered to each other or in loose contact, and winding the assembled wrapper directly on the pipe.

Other objects and features of the invention will become apparent as the description proceeds, especially when taken in conjunction with the accompanying drawing wherein.

Figure 1:
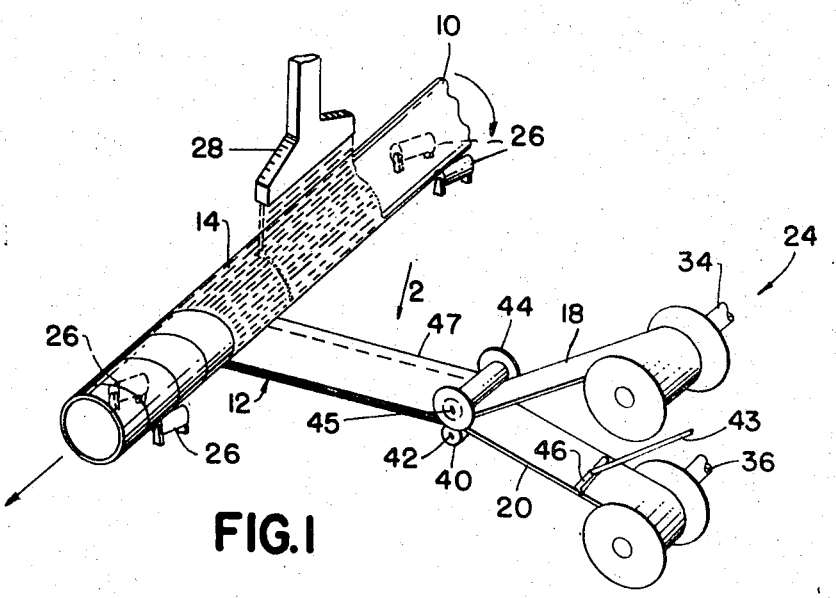
FIG. 1 is a perspective view showing apparatus employed in the process of wrapping a length of pipe according to my invention.
Figures 2, 3:
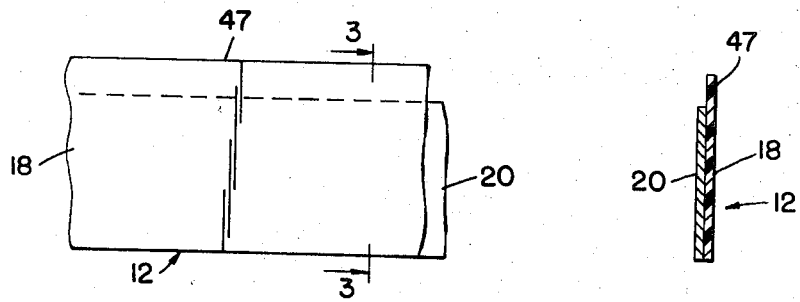
FIG. 2 is a fragmentary view of a portion of the composite wrapper just before it is wound on the pipe, looking in the direction of the arrow 2 in FIG. 1.
FIG. 3 is a sectional view taken on the line 3—3 of FIG. 2.

Referring now more particularly to the drawing, the numeral 10 designates a pipe, conduit or other elongated element which is intended to be installed in the ground. In order to protect the pipe against corrosion a suitable covering is provided. The numeral 12 generally designates a composite strip wrapper which forms a part of the pipe covering and provides a protective barrier around the pipe to prevent deterioration thereof as a result of various conditions, phenomena or elements in the soil. The reference numeral 14 denotes a coating applied to the pipe before the strip wrapper 12 is applied. The coating may be a heat softenable thermoplastic such as a bitumen or microcrystalline wax which is hot-applied. The coating protects the pipe from agents of corrosion. The strip wrapper has the additional function of preventing the coating from being abraded off or deformed by the action of soil stress or other mechanical action.

The strip wrapper 12 comprises two strips, one of which is a continuous relatively thin flexible elongated plastic film 18, and the other a flexible elongated carrier board 20. The plastic film 18 may be formed of polyethylene, polyvinyl chloride, polyester, polypropylene, polyvinylidene chloride, cellulose acetate, or other synthetic resinous plastic material. Saturated or unsaturated industrial paper, metal, cloth, rubber or other suitable material may be used as the carrier board 20. The carrier board 20 is preferably, although not necessarily, adhered to the plastic film 18 and reinforces, supports, and otherwise protects the same.

The coating and strip wrapper are applied to the pipe by the stationary apparatus generally designated 24. Such apparatus includes means for both coating and wrapping the pipe. The pipe is supported on a plurality of rollers 26 which extend obliquely with respect to the axis of the pipe in a manner such that rotation of the rollers in the same direction will effect not only a rotation of the pipe, but also a longitudinal movement of the pipe along its axis. Suitable means, not shown, are provided to positively drive one or more of the rollers 26 in the same direction.

The apparatus 24 also includes a fixed spigot or weir 28 which floods the coating material 14 onto the spiralling pipe. A pump, not shown, is provided for pumping the coating under pressure to the weir 28 from a supply source.

The apparatus 24 has a pair of stationary spindles 34 and 36 mounted in close proximity to one another. A roll of the plastic film 18 is rotatably supported on spindle 34 and a roll of the carrier board 20 is rotatably supported on spindle 36. As the pipe rotates past the point of wrapper application, the plastic film 18 and carrier board 20 are brought into surface-to-surface contact lengthwise of one another and are spirally wound onto the coated pipe in the manner hereinafter described.

The apparatus 24 includes parallel, closely spaced idler rollers 40 and 44 mounted on stationary spindles 42 and 45 located between the wrapper components and the pipe. As shown in FIG. 1, the plastic film 18 and carrier board 20 are, during the wrapping operation, withdrawn from their respective rolls and pass between the rollers 40 and 44 where they are brought into surface-to-surface contact lengthwise of one another. From this point, that is from rollers 40 and 44, to the pipe the plastic film 18 and carrier board 20 remain in surface-to-surface contact with one another in the relationship shown.

A suitable adhesive or bonding agent may be, and preferably is, applied to either the plastic film or the carrier board at a point prior to their coming into surface-to-surface contact. For this purpose, the apparatus 24 has a pipe 43 supported in fixed position over the carrier board material between the supply roll and the roller 40, which pipe leads to a hollow tube 46 that extends across the carrier board and has a plurality of orifices for depositing adhesive onto the carrier board. The adhesive will serve to secure the plastic film and carrier board together beyond rollers 40 and 44.

It should be understood that the adhesive may, if desired, be omitted and the carrier board and plastic film merely brought together in surface-to-surface contact before being applied to the pipe without any adhering or bonding agent whatsoever.

Whether or not the plastic film 18 and carrier board 20 are adhered together, they are wrapped on the pipe in the relationship to one another clearly shown in the drawing in which one longitudinal edge portion 47 of the plastic film extends laterally beyond the corresponding longitudinal edge of the carrier board. The opposite longitudinal edges of the plastic film and carrier board may be substantially flush with one another, as shown.

Figure 4:
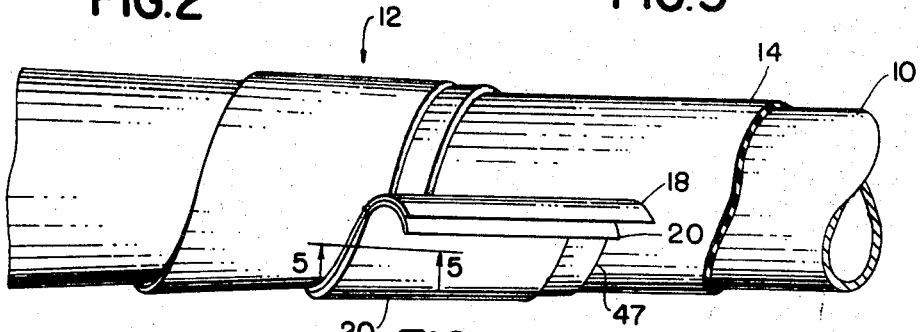
FIG. 4 is a fragmentary elevation of the coated and wrapped pipe.
Figure 5:
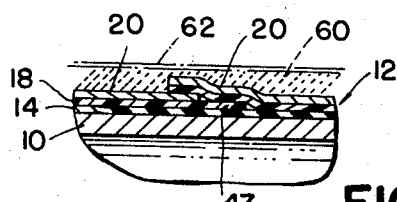
FIG. 5 is a sectional view taken on the line 5—5 of FIG. 4.

In operation, the spigot or weir 28 applies a continuous flow of the hot coating material 14 over the entire outer surface of the pipe. While the coating remains in a hot condition, the plastic film 18 and carrier board 20 are continuously withdrawn from their respective rolls and brought together at the point of rollers 40 and 44 and spirally wound on the pipe with the plastic film 18 inward toward the pipe. The wrapper is so applied that the longitudinal edge portion 47 of the plastic film 18 becomes the leading edge portion of the wrapper which is overlapped in succeeding convolutions as shown in FIGS. 4 and 5. Thus there is a continuous marginal overlap between the outer surface of the edge portion 47 of the plastic film and the inner surface of the plastic film in the succeeding convolutions. This provides a continuous plastic-to-plastic overlapped joint which excludes moisture and other foreign material. The heat of the coating 14 may be sufficient to actually soften the plastic film 18 to the point of achieving a molecular weld along the continuous plastic overlap joint.

The coating material is usually applied at an elevated temperature in the range of approximately 250° F. to 500° F. Since the plastic film is applied immediately over the hot coated pipe the plastic film will tend to soften and part in this temperature range. Parting of the plastic film is prevented, however, by the carrier board 20 which supports the plastic film as it is applied to the hot coated pipe. The carrier board not only protects the plastic film against physical injury but also supports the plastic film when it comes into contact with the hot coating and prevents parting or ruptures from occurring in the film due to a loss in tensile strength resulting from the heat of the coating.

Should a later hot coating of the material 14 be applied over the spirally wrapped pipe, the carrier board 20 also protects the plastic film from the effects of the heat of the outer coating. Such an outer coating is shown in dotted lines in FIG. 5 and designated 60 and may be applied at the same temperature range as coating 14 from a weir or spigot similar to the one indicated at 28 but located farther down the line past which the spiralling pipe moves. If an outer coating 60 is applied, then preferably an outer wrapper 62 is spirally applied over coating 60 as part of the continuous operation.

The carrier board is seen in FIG. 5 as completely covering the plastic. Thus the trailing edge portion of the carrier board 20 covers the preceding convolution including the leading edge portion 47 of the plastic and the leading edge of the carrier board, so that in effect the plastic film is completely covered by the carrier board.

Figure 6:
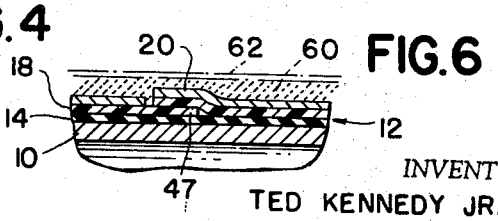
FIG. 6 is similar to FIG. 5 but shows a modification.

It will be understood that the carrier board 20 and plastic film 18 may also be applied in a manner such that the carrier board and plastic film do not cover the leading edge of the carrier board of the previous convolution but do at least in part overlap the plastic edge of the previous convolution. Such a condition is shown in FIG. 6. This form of the invention also clearly provides a plastic-to-plastic continuous marginal contact for sealing out impurities. As in the case of the invention as seen in FIG. 5, the carrier board protects the plastic film from the heat of the coating 14 and/or 60. Otherwise the invention in FIG. 6 is the same as in FIG. 5.

What I claim as my invention is:

1. In a method of applying a protective cover to a pipe, the steps of providing separate sources of a length of flexible plastic film and of a length of flexible carrier board, heating coating material to an elevated temperature sufficiently high to render it flowable for application to the pipe and to have a deleterious effect upon said plastic film, applying the heated coating material to the pipe, and then in a continuous operation withdrawing said plastic film and said carrier board from the separate sources thereof, bringing the withdrawn plastic film and carrier board into superimposed surface-to-surface relation lengthwise of one another at a point spaced from and prior to contact with the coated pipe, and helically winding the superimposed plastic film and carrier board about the coated pipe with the plastic film inward toward the coated pipe while said coating material is still hot enough to have a deleterious effect upon said plastic film, said carrier board supporting and protecting said plastic film from the heat of the coating.

2. The method defined in claim 1, including adhering said plastic film and said carrier board together after withdrawal from the separate supplies thereof and before winding the same on said pipe.

3. In a method of applying a protective cover to a pipe, the steps of providing separate sources of a length of flexible plastic film and of a length of flexible carrier board, providing a source of a heated coating material at a temperature which is sufficiently high to render it flowable for application to the pipe but which is also sufficiently high to have a deleterious effect upon said plastic film, applying the heated coating material to the pipe, and then in a continuous operation withdrawing said plastic film and said carrier board from the separate sources thereof, bringing the withdrawn plastic film and carrier board into superimposed surface-to-surface relation lengthwise of one another at a point spaced from and prior to contact with the coated pipe and so that one longitudinal edge portion of said plastic film extends laterally beyond the corresponding edge portion of said carrier board, helically winding the superimposed plastic film and carrier board about the coated pipe with the plastic film inward toward the coated pipe, and in a manner such that said one longitudinal edge portion is the leading edge portion, while said coating material is still hot enough to have a deleterious effect upon said plastic film, said carrier board supporting the superimposed plastic film continuously from the point where it is brought into contact therewith and protecting said plastic film from the heat of the coating, and causing a continuous overlapping plastic-to-plastic contact between said one longitudinal edge portion of each convolution of said plastic film and the succeeding convolution thereof.

4. The method defined in claim 3 wherein the trailing edge portions of the convolutions of said carrier board overlap the leading edge portions of the convolutions thereof and completely cover said plastic-to-plastic contact.

5. The method defined in claim 3, including adhering said plastic film and carrier board together after withdrawal from the separate supplies thereof and before winding the same on said pipe.

References Cited

UNITED STATES PATENTS

| | | | |
|---|---|---|---|
| 2,525,469 | 10/1950 | Anderson | 156—185 X |
| 2,828,798 | 4/1958 | Hopkins et al. | 156—187 |
| 2,937,665 | 5/1960 | Kennedy | 156—187 X |
| 3,005,742 | 10/1961 | Kennedy | 156—187 |
| 3,024,153 | 3/1962 | Kennedy | 156—187 |
| 3,126,034 | 3/1964 | Kennedy | 156—185 X |
| 3,362,861 | 1/1968 | Barker et al. | 156—185 X |

BENJAMIN R. PADGETT, Primary Examiner

G. G. SOLYST, Assistant Examiner

U.S. Cl. X.R.

156—3.92